United States Patent
Eble

(10) Patent No.: US 11,057,614 B1
(45) Date of Patent: Jul. 6, 2021

(54) MOTION BLUR COMPENSATION THROUGH DISPLAY ACTUATION

(71) Applicant: Apple Inc., Cupertino, CA (US)

(72) Inventor: Tobias Eble, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/555,279

(22) Filed: Aug. 29, 2019

Related U.S. Application Data

(60) Provisional application No. 62/727,093, filed on Sep. 5, 2018.

(51) Int. Cl.
*H04N 13/383* (2018.01)
*G09G 3/20* (2006.01)
*H04N 13/351* (2018.01)
*H04N 13/344* (2018.01)

(52) U.S. Cl.
CPC ......... *H04N 13/383* (2018.05); *G09G 3/2018* (2013.01); *H04N 13/344* (2018.05); *H04N 13/351* (2018.05); *G09G 2320/0261* (2013.01); *G09G 2320/103* (2013.01); *G09G 2330/021* (2013.01); *G09G 2340/0435* (2013.01)

(58) Field of Classification Search
CPC .. H04N 13/383; H04N 13/344; H04N 13/351; G09G 3/2018; G09G 2320/0261; G09G 2320/103; G09G 2340/0435
See application file for complete search history.

(56) References Cited

U.S. PATENT DOCUMENTS

| | | | |
|---|---|---|---|
| 7,747,153 B2 | 6/2010 | Ibaraki | |
| 7,822,330 B2 | 10/2010 | Hasuda | |
| 8,605,008 B1 | 12/2013 | Prest et al. | |
| 9,866,756 B2 | 1/2018 | Nakamura | |
| 2012/0311590 A1* | 12/2012 | Park | G06F 1/329 718/102 |
| 2015/0084862 A1* | 3/2015 | Sugihara | G02B 27/0179 345/156 |
| 2015/0168722 A1* | 6/2015 | Cho | G06F 1/1637 345/156 |
| 2017/0358141 A1 | 12/2017 | Stafford et al. | |
| 2018/0217380 A1* | 8/2018 | Nishimaki | G02B 27/0176 |
| 2018/0295290 A1* | 10/2018 | Nakamura | G06F 3/011 |
| 2018/0359463 A1* | 12/2018 | Mori | H04N 13/344 |

* cited by examiner

*Primary Examiner* — Vijay Shankar
*Assistant Examiner* — Nathaniel P Brittingham
(74) *Attorney, Agent, or Firm* — Thompson Hine LLP

(57) ABSTRACT

In one implementation, a method of compensating for motion blur while presenting content on a display of an electronic device through display actuation is disclosed. The method involves detecting movement of the electronic device using a sensor of the electronic device while presenting content on a display of the electronic device. An inter-frame movement of the electronic device is determined based on the movement of the electronic device. The display is moved using an actuator of the electronic device that is coupled to the display such that movement of the display opposes the inter-frame movement of the electronic device.

20 Claims, 6 Drawing Sheets

MOTION BLUR COMPENSATION THROUGH DISPLAY ACTUATION

CROSS-REFERENCE TO RELATED APPLICATION

This Application claims the benefit of U.S. Provisional Application Ser. No. 62/727,093 filed Sep. 5, 2018, which is incorporated herein in its entirety.

TECHNICAL FIELD

The present disclosure generally relates to systems, methods, and devices for presenting content on a display of an electronic device, and in particular, to compensating for motion blur while presenting content on a display of an electronic device through display actuation.

BACKGROUND

The human visual system integrates information across time. Consequently, optical energy that moves across a person's retina faster than the retina can react to such stimulus would be perceived as blurred or smeared. This phenomenon is referred to as motion blur or retinal smear. In the context of display devices, motion blur may arise due to a frame rate of content presented on a display, a response time of pixels comprising the display, or when objects within the content transition quickly across the display. When a display device is attached to a user (e.g., a head-mounted device), motion blur may be associated with inter-frame movement of the display device itself. One existing technique of compensating for motion blur includes reducing a duty cycle of the display (pixel persistence), which reduces the amount of time that activated pixels remain illuminated after each frame update. Yet, any reduction in the effects of motion blur that is achieved by reducing the display duty cycle comes with tradeoff costs. One such tradeoff cost is that a perceived brightness of the display device would also be reduced because of the manner in which the human visual system processes visual stimuli. Thus, it may be desirable to provide a means of compensating for motion blur while presenting content on a display of an electronic device that eliminates or reduces such tradeoff costs.

SUMMARY

Various implementations disclosed herein include devices, systems, and methods of compensating for motion blur while presenting content on a display of an electronic device through display actuation. In one implementation, a method involves detecting movement of the electronic device using a sensor of the electronic device while presenting content on a display of the electronic device. An inter-frame movement of the electronic device is determined based on the movement of the electronic device. The display is moved using an actuator of the electronic device that is coupled to the display such that movement of the display opposes the inter-frame movement of the electronic device.

In another implementation, an electronic device includes a display, a processor, and an actuator device that is coupled to the display. The processor is configured to determine a translation vector using data corresponding to movement of the electronic device. The translation vector defines inter-frame movement of a pixel of the display. The actuator device is configured to move the display based on the translation vector such that movement of the display opposes the movement of the electronic device.

In another implementation, an electronic device includes a sensor, a processor, and an actuator adapted to couple with a display. The sensor is configured to detect movement of the electronic device. The processor is configured to determine a translation vector based on the movement of the electronic device. The translation vector defines a displacement of the electronic device in a ground reference frame between a first time and a second time subsequent to the first time. The actuator is configured to impart a motive force based on the translation vector such that a movement associated with the motive force opposes the movement of the electronic device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
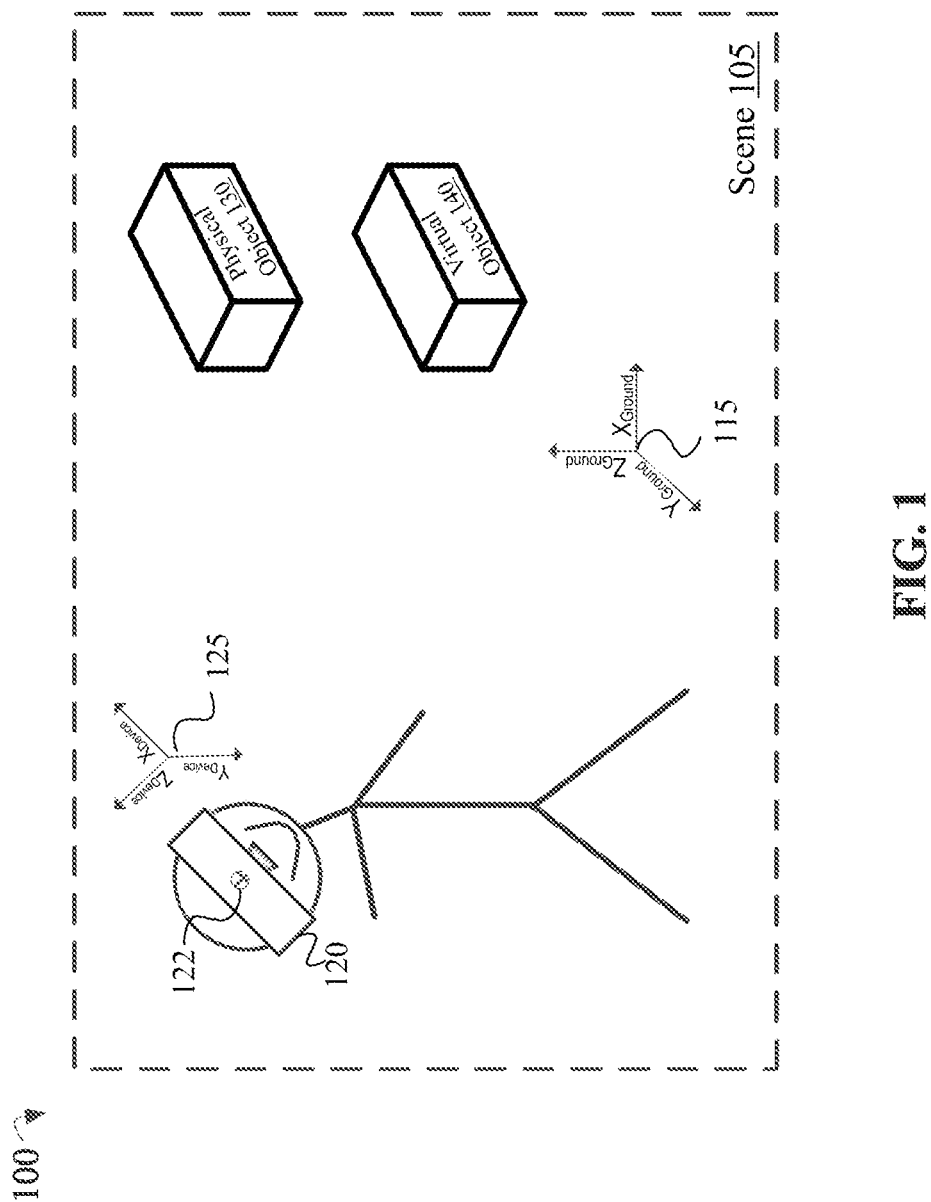
FIG. 1 is a block diagram of an example operating environment, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, an example operating environment 100 for implementing aspects of the present disclosure is illustrated and designated generally 100. In general, operating environment 100 illustrates an electronic device 120 configured to present a user with a user experience. In some implementations, the user experience involves a computer-generated reality (CGR) environment.

A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. As used herein, an HMD in which at least some light of the physical environment may pass through a transparent or translucent display is called an "optical see through" HMD.

Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display.

Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment.

Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Electronic device 120 is shown as a head-mounted device ("HMD") in the example depicted by FIG. 1. Those skilled in the art will recognize that an HMD is but one form factor that is suitable for implementing electronic device 120. Other form factors that are suitable for implementing electronic device 120 include smartphones, AR glasses, smart glasses, desktop computers, laptops, tablets, computing devices, and the like. In some implementations, electronic device 110 includes a suitable combination of software, firmware, or hardware.

Figure 2:
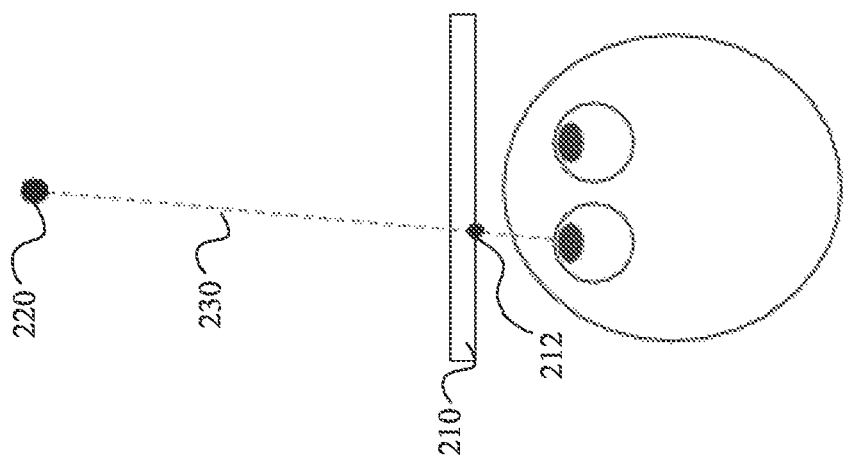
FIG. 2 illustrates a top-down view of an electronic device presenting content on a display at a first point in time, in accordance with some implementations.
Figure 3:
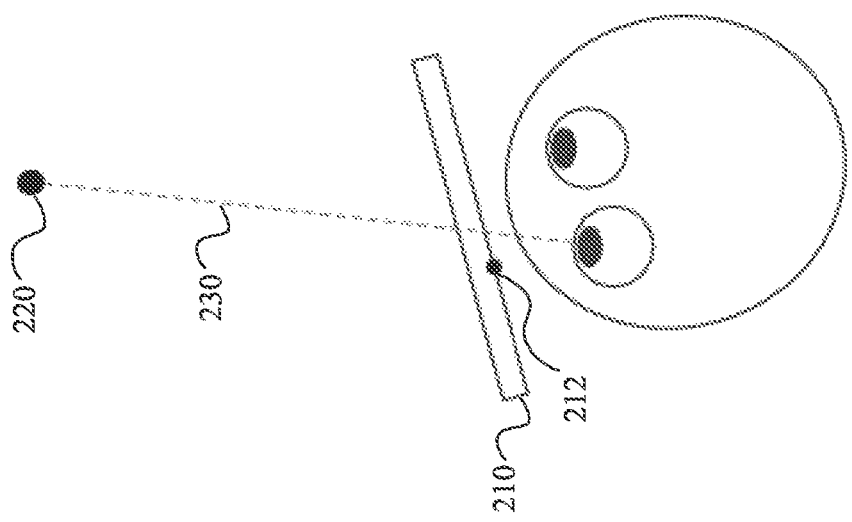
FIG. 3 illustrates a top-down view of the electronic device of FIG. 2 at a second point in time, in accordance with some implementations.
Figure 4:
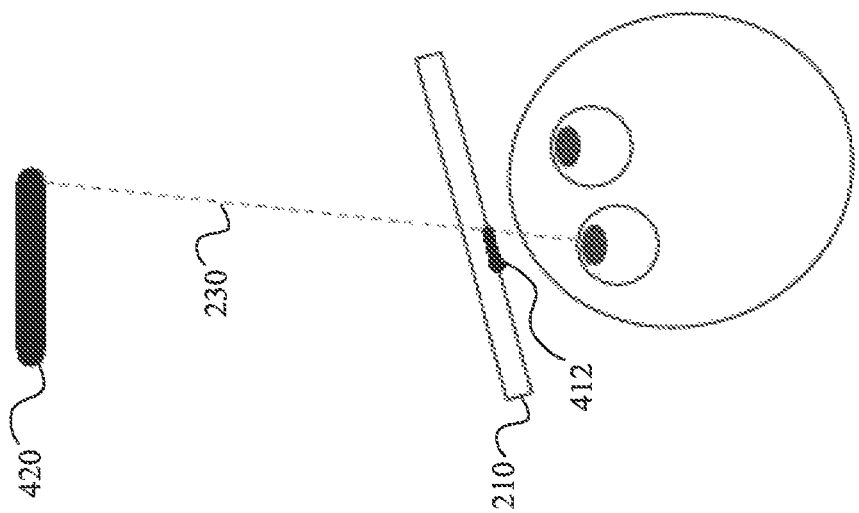
FIG. 4 illustrates a top-down view of the electronic device of FIGS. 2 and 3 between the first and second points in time, in accordance with some implementations.
Figure 11:
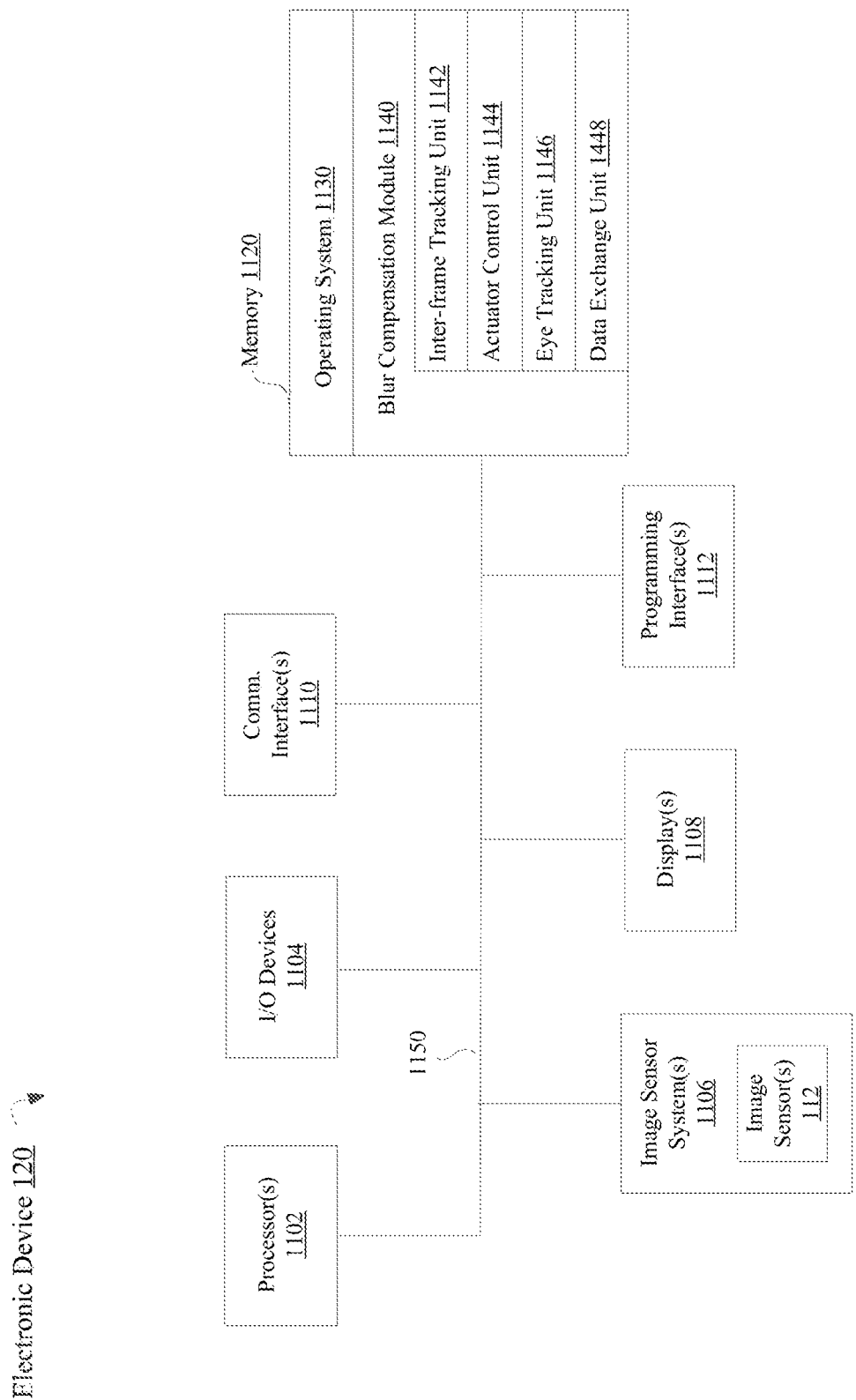
FIG. 11 is a block diagram of an example electronic device that is suitable for some implementations.

For example, electronic device 120 may include image sensor 112 and an output device (e.g., display 210 of FIGS. 2-4 or display 1108 of FIG. 11). Examples of suitable devices for implementing the output device include a display, an audio speaker, a haptic device, and the like. In one implementation, electronic device 120 includes an output device disposed on an inward facing surface of electronic device 120.

Image sensor 112 is configured to obtain image data corresponding to a scene or physical environment (e.g., scene 105) in which electronic device 120 is located. In one implementation, image sensor 112 is part of an array of image sensors configured to capture light field images corresponding to a physical environment (e.g., scene 105) in which electronic device 120 is located. In one implementation, image sensor 112 is a component of a depth camera.

Some implementations describe virtual sensory content and physical sensory content in terms of visual sensory content. However, implementations are not limited to visual sensory content, but rather may include any type of sensory content described above with respect to FIG. 1 when an electronic device includes appropriate sensors and output devices. For example, aspects of the present disclosure are equally applicable to auditory content when an electronic device includes appropriate sensors and output devices, such as a microphone and speaker, respectively.

FIGS. 2-4 illustrate top-down views of an electronic device (e.g., electronic device 120 of FIG. 1) presenting content on a display 210 that is perceivable by a user, in accordance with some implementations. Image data corresponding to a frame of the content is presented on display 210 by activating pixel 212 of display 210 at a first point in time, as seen in FIG. 2. In the example illustrated by FIGS. 2-4, the content corresponding to activated pixel 212 is perceivable within a field of view of the user at focal point 220 along a visual axis (or line of sight) 230 of the user. Before the frame of content (corresponding to activated pixel 212) is updated on display 210, the user continues to focus on focal point 220 while causing the electronic device to move by repositioning their head at a second point in time, as illustrated by FIG. 3.

Such inter-frame movement of the electronic device also causes display 210, which is coupled to the electronic device, to move while presenting the frame of content. Since activated pixel 212 is located in a fixed position of display 210, the inter-frame movement of the electronic device also causes activated pixel 212 to move while presenting the frame of content. Thus, the inter-frame movement of the electronic device displaces activated pixel 212 with respect to visual axis 230, as seen by comparing FIG. 2 with FIG. 3. This displacement of activated pixel 212 with respect to visual axis 230 is represented by designator 412 of FIG. 4, which illustrates a top-down view of the electronic device during a transition period defined by the first and second points in time. During the transition period illustrated by FIG. 4, activated pixel 212 remains illuminated as it is displaced with respect to visual axis 230 moves across a retina of the user at a distance that is proportional to displacement 412. As a result of motion blur, the image data corresponding to activated pixel 212 during the transition period (represented by designator 420 in FIG. 4) would be perceived by the user as blurred or smeared.

Figures 5, 6, 7:
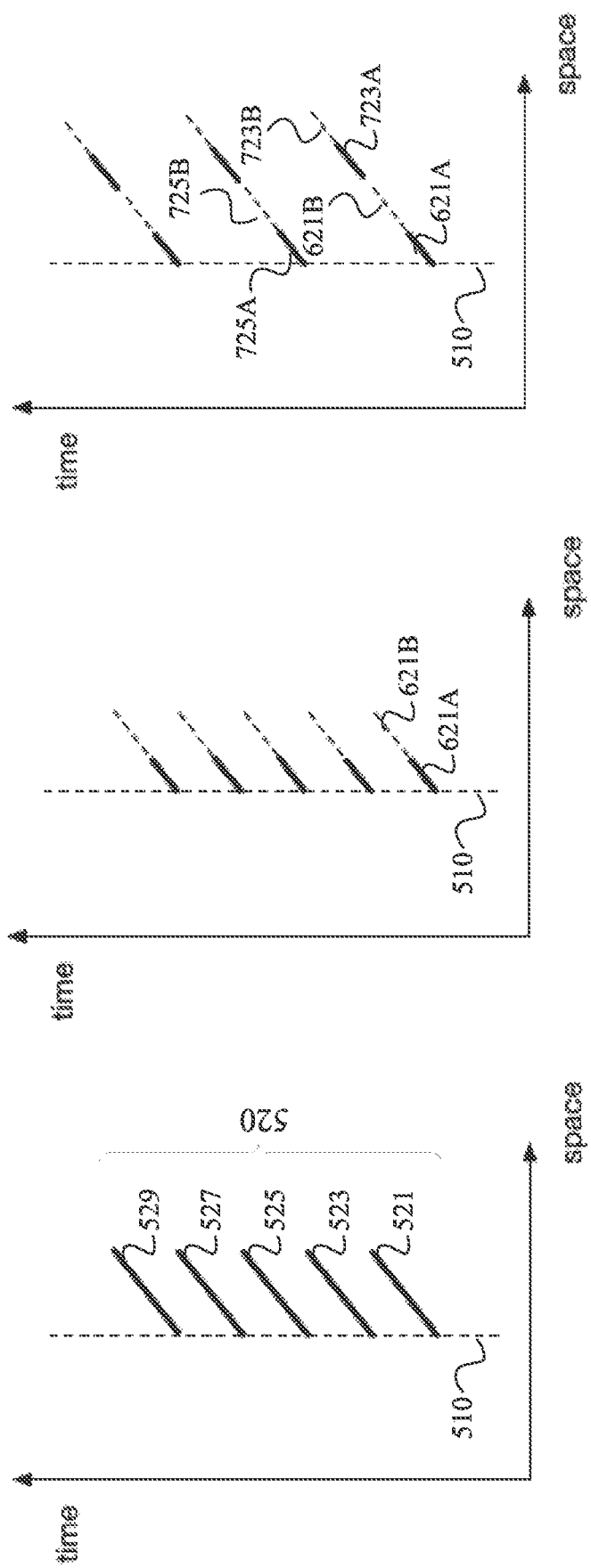
FIG. 5 is a space-time diagram representing a technique of compensating for motion blur due to inter-frame movement of an electronic device through modifying content frame rate, in accordance with some implementations.
FIG. 6 is a space-time diagram representing a technique of compensating for motion blur due to inter-frame movement of an electronic device through modifying display duty cycle, in accordance with some implementations.
FIG. 7 is a space-time diagram illustrating an artifact that results when missed frame updates coincide with inter-frame movement of an electronic device, in accordance with some implementations.

FIGS. 5-7 illustrate space-time diagrams that are each normalized with respect to a visual axis 510 of a user (e.g., visual axis 230 of FIGS. 2-4), and thus visual axis 510 forms a reference coordinate system. Each space-time diagram includes an x-axis (labeled "space") and a corresponding y-axis (labeled "time"). In FIGS. 5-7, inter-frame movement of an electronic device caused by the user occurs in a leftward direction with respect to visual axis 510 along the x-axis towards the y-axis. That inter-frame movement causes motion blur in a rightward direction with respect to visual axis 510 along the x-axis away from the y-axis.

One technique of compensating for motion blur due to inter-frame movement of an electronic device involves modifying a frame rate at which content is presented on a display. For example, in FIG. 5, the user perceives image data corresponding to five frames of content 520 (i.e., frames 521, 523, 525, 527, and 529). In FIG. 5, activated pixels of the display remain illuminated for the duration of each frame while being displaced with respect to visual axis 510 (due to inter-frame movement). As a result of motion blur, the user would perceive image data corresponding to a particular frame as blurry for a duration of that frame.

The effects of such motion blur could be reduced by increasing a frame rate of content 520. For example, the user would experience less motion blur if the frame rate of content 520 was increased such that six frames of content 520 were presented within the same period of time that five frames of content 520 was presented in FIG. 5. Conversely, the effects of such motion blur would be increased by reducing a frame rate of content 520. For example, the user would experience more motion blur if the frame rate of content 520 was decreased such that four frames of content 520 were presented within the same period of time that five frames of content 520 was presented in FIG. 5.

Another technique of compensating for motion blur due to inter-frame movement of an electronic device involves modifying a duty cycle of a display presenting the content. For example, similar to FIG. 5, the user perceives image data corresponding to five frames of content in FIG. 6. However, unlike FIG. 5, activated pixels of the display do not remain illuminated for the duration of each frame while being displaced with respect to visual axis 510 in FIG. 6. Instead, activated pixels remain illuminated for a portion of that duration in FIG. 6. As an example, if one frame of content in FIG. 6 consists of frame portion 621A and frame portion 621B, the duty cycle of the display may be modified such that activated pixels only remain illuminated during frame portion 621A. During frame portion 621B, those pixels are not illuminated or are otherwise deactivated. Because no optical energy is emitted by pixels when pixels are deactivated, no optical energy is moving across a user's retina during frame portion 621B to be perceived as blurred or smeared. Thus, the effects of motion blur in FIG. 6 are reduced with respect to the effects of motion blur in FIG. 5 as a result of the reduction in time during which activated pixels remain illuminated for each frame.

FIG. 7 illustrates one artifact that results when missed frame updates coincide with inter-frame movement of an electronic device. In FIGS. 5 and 6, each frame of content is depicted as originating at visual axis 510. By way of example, this may be achieved by intra-frame realignment of content with visual axis 510 during frame updates. In one implementation, the electronic device may detect displacement (e.g., displacement 412 of FIG. 4) of activated pixels with respect to visual axis 510 prior to performing a frame update. In one implementation, the displacement of activated pixels is detected using an eye tracking characteristic of the user. In one implementation, the eye tracking characteristic of the user is determined by an eye tracking unit of the electronic device (e.g., eye tracking unit 1146 of FIG. 11). In one implementation, the electronic device remaps image data to pixels of the display prior to frame updates based on an offset value determined using the detected displacement to realign the content with visual axis 510.

When such intra-frame realignments are missed, image data may instead be mapped to displaced pixels during a frame update, as illustrated by FIG. 7. For example, in FIG. 6, a frame of content following the frame of content defined by frame portions 621A and 621B is realigned with visual axis 510. However, in FIG. 7, that frame of content (defined by frame portions 723A and 723B) instead remains mapped to the displaced pixel. Intra-frame realignment occurs prior to a subsequent frame update in FIG. 7, and consequently image data corresponding to that subsequent frame (defined by frame portions 725A and 725B) is realigned with visual axis 510. The transitioning of the displaced pixel between being illuminated (during frame portions 721A and frame portions 723A) and being deactivated (and thus not illuminated during frame portion 721B) introduces a "ghosting" artifact in which the user perceives a "ghost" image. In one implementation, if full persistence is enabled such that activated pixels remain illuminated for a duration of a frame (e.g., as in FIG. 5) when intra-frame realignments do not occur, an "extended blur" artifact would be introduced in which a length of the perceived motion blur is extended.

Figure 8:
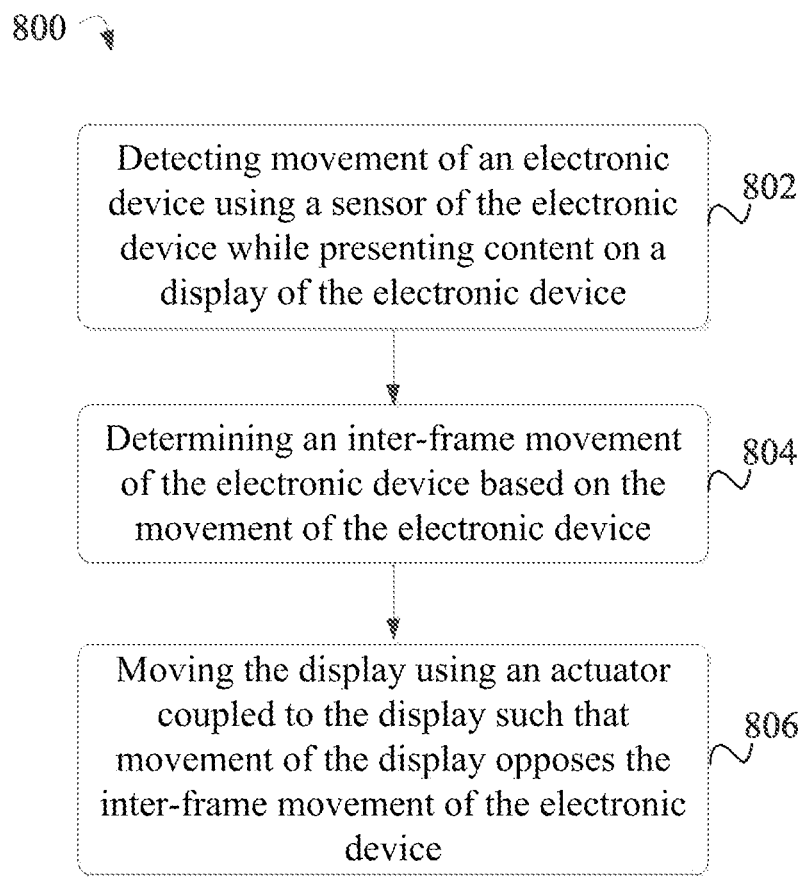
FIG. 8 is a flow-chart illustrating an example of a method of compensating for motion blur while presenting content on a display of an electronic device through display actuation.

Another technique of compensating for motion blur due to inter-frame movement of an electronic device involves actuating a display presenting the content. Specifically, in accordance with implementations of the present disclosure, the effects of motion blur may be reduced by moving the display such that movement of the display opposes the inter-frame movement of the electronic device. FIG. 8 is a flow-chart illustrating an example of a method 800 of this technique of compensating for motion blur while presenting content on a display of an electronic device through display actuation.

At block 802, method 800 includes detecting movement of the electronic device using a sensor of the electronic device while presenting content on the display. In various implementations, block 802 may involve detecting the movement of the electronic device while: (i) pixels are activated for a particular frame; (ii) between frames; or (iii) both. For example, electronic device 210 of FIGS. 2-4 may detect movement after activating pixel 212 at the first point in time. In one implementation, the movement is detected using data corresponding to the movement of the electronic device, such as inertial data, image data, or a combination thereof. In one implementation, the sensor is an inertial measurement unit ("IMU") configured to provide inertial data associated with the movement of the electronic device.

Generally, an IMU is a computing device that provides inertial data by sampling signals generated by one or more sensors of the IMU. The one or more sensors may include: one-to-tri-axial accelerometers for measuring changes in velocity along one to three axes, one-to-tri-axial axis gyroscopes for measuring angular velocity about one to three axes, one-to-tri-axial magnetometers for measuring information regarding magnetic fields relative to one to three axes, a barometric pressure sensor for measuring atmospheric pressure, and the like. When an IMU is coupled to the electronic device, the inertial data provided by the IMU corresponds to movement of that device in a global reference (or navigation) frame (e.g., global reference frame 115 of FIG. 1). In various implementations, inertial data provided by an IMU facilitates numerous functionalities, such as detecting movement of the electronic device, determining an inter-frame movement of the electronic device based on that detected movement, and the like.

In one implementation, the image sensor is an image sensor of the electronic device. In one implementation, the image sensor is configured to generate image data depicting a proximate environment of the electronic device. In one implementation, the image sensor is disposed on an outward facing surface of the electronic device. In one implementation, the image sensor is external to the electronic device. In one implementation, the image sensor is an image sensor of a control unit associated with the electronic device that is physically remote from the electronic device. In one implementation, the sensor is an image sensor configured to generate image data depicting a user of the electronic device. In one implementation, the image sensor is disposed on an inward facing surface of the electronic device.

At block 804, method 800 includes determining an inter-frame movement of the electronic device based on the movement of the electronic device. In one implementation, the inter-frame movement is determined using an inter-frame tracking unit of the electronic device (e.g., inter-frame tracking unit 1142 of FIG. 11). In one implementation, determining the inter-frame movement comprises determining a translation vector defining the inter-frame movement. An example of a translation vector is described in greater detail below with respect to FIG. 9.

In one implementation, an amplitude of the translation vector is determined based on a velocity associated with the detected movement of the electronic device. In one implementation, the velocity associated with the detected motion corresponds to one axial direction. In one implementation, the velocity associated with the detected motion corresponds to a plurality of axial directions. In one implementation, an orientation of the translation vector is determined based on a direction associated with the detected motion. In one implementation, the orientation associated with the detected motion corresponds to one axial direction. In one implementation, the orientation associated with the detected motion corresponds to a plurality of axial directions.

In one implementation, determining the inter-frame movement comprises applying sensor data characterizing inter-frame movement of the electronic device that is associated with a current frame of content as an input to a model configured to predict inter-frame movement of the electronic device that is associated with a future frame of content subsequent to the current frame. In one implementation, the model is trained with a dataset of sensor data characterizing movement of the electronic device using a machine learning process. In one implementation, the dataset is populated with crowd-sourced sensor data, user-specific sensor data, or a combination thereof.

At block 806, method 800 includes moving the display using an actuator of the electronic device that is coupled to the display such that movement of the display opposes the inter-frame movement of the electronic device. Examples of suitable actuators include piezo-electric actuators, electromagnetic actuators, and the like. In one implementation, moving the display is based on a translation vector that defines the inter-frame movement of the electronic device. In one implementation, the actuator produces a linear motive force along a single axis. In one implementation, the actuator is configured to impart a unidirectional motive force along one axis. In one implementation, the actuator is a two-dimensional stage actuator configured to impart a bidirectional motive force along two orthogonal axes.

In one implementation, the actuator is configured to produce an oscillatory motive force along a single axis. An example of imparting an oscillatory motive force on a display along a single axis is described in greater detail below with respect to FIG. 10. In one implementation, the oscillatory force moves the display in a first direction along the single axis while the display is emitting light and a second, opposite direction along the single axis while the display is not emitting light. In one implementation, the oscillatory motive force has an amplitude element corresponding to a velocity associated with the movement of the electronic device. In one implementation, the oscillatory motive force has an orientation element that relates to a direction associated with the movement of the electronic device.

In one implementation, method 800 further comprises synchronizing a display duty cycle of the display with the movement of the display to increase a likelihood that the display emits light when the display is linearly accelerating. In one implementation, the actuator is a first actuator. In one implementation, moving the display comprises imparting a first motive force along a first axis with the first actuator and imparting a second motive force along a second axis that is orthogonal to the first axis with a second actuator.

In one implementation, method 800 is performed by processing logic, including hardware, firmware, software, or a combination thereof. In one implementation, method 800 is performed by a processor executing code stored in a non-transitory computer-readable medium (e.g., a memory).

Figure 9:
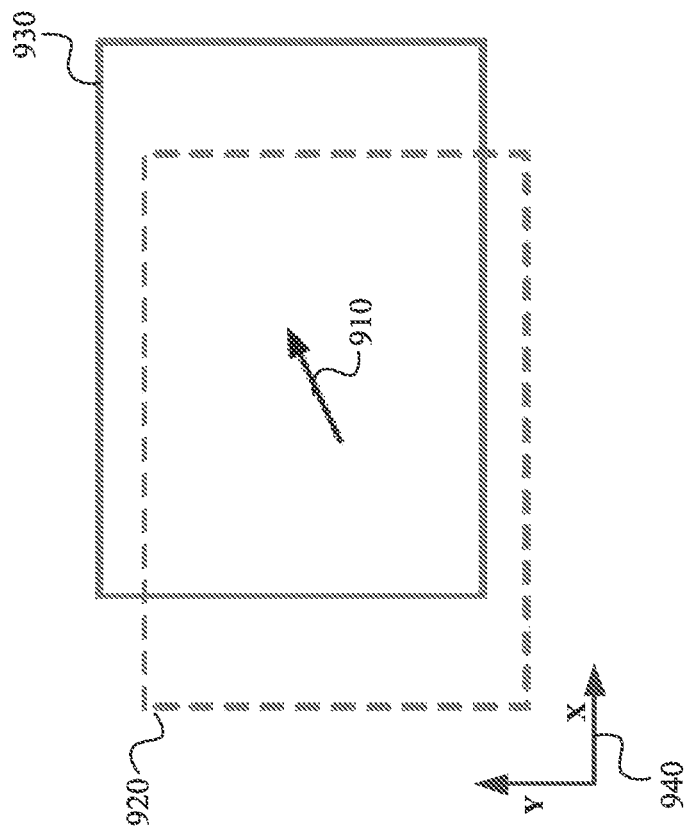
FIG. 9 illustrates a projection of a translation vector defining inter-frame movement of an electronic device, in accordance with some implementations.

FIG. 9 illustrates a projection of a translation vector 910 defining inter-frame movement of an electronic device, in accordance with some implementations. In general, a translation vector 910 describes a displacement between a second position of an electronic device when presenting a current frame of content (e.g., frame 930) and a first position of the electronic device when presenting a previous frame of the content (e.g., frame 920) that precedes the current frame. The translation vector 910 may be determined using any of the data corresponding to the movement of the electronic device (e.g., inertial data, image data, or a combination thereof) described above with respect to FIG. 8.

The translation vector 910 describes that displacement in terms of a distance that the electronic device moved between the two positions and a direction that the electronic device moved to reach the second position from the first position. In one implementation, the direction is defined with respect to a global reference frame (e.g., global reference frame 115 of FIG. 1). In one implementation, the direction is defined with respect to a device reference frame (e.g., device reference frame 125 of FIG. 1).

Upon determining the translation vector 910, an inter-frame tracking unit of the electronic device (e.g., inter-frame tracking unit 1142 of FIG. 11) projects (or maps) the translation vector 910 to a reference frame 940 corresponding to an image plane of the display. In one implementation, the inter-frame tracking unit projects the translation vector 910 to reference frame 940 using a known correspondence between the device reference frame and reference frame 940. In one implementation, projecting the translation vector 910 defining the inter-frame movement of the electronic device to reference frame 940 enables an actuator control unit of the electronic device (e.g., actuator control unit 1144 of FIG. 11) to determine a motive force that compensates for that inter-frame movement.

Figure 10:
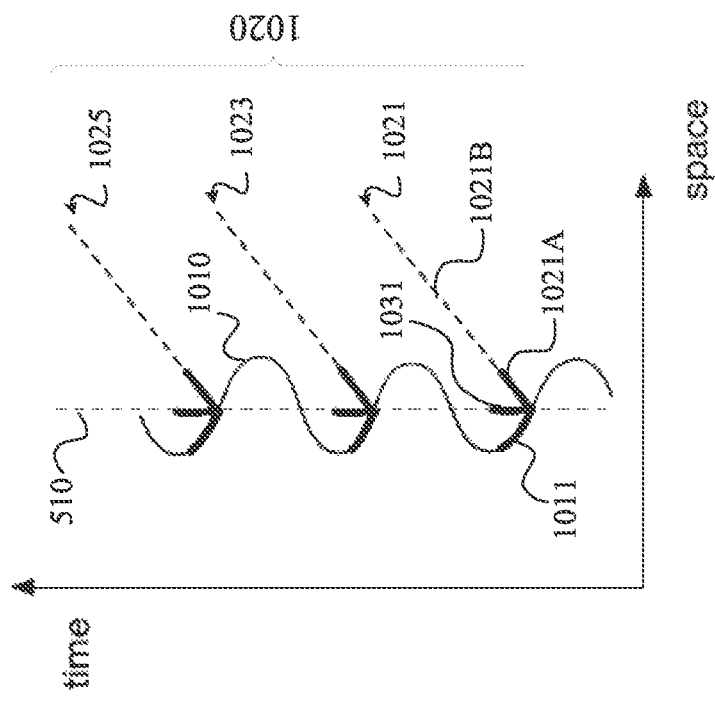
FIG. 10 is a space-time diagram representing a technique of compensating for motion blur due to inter-frame movement of an electronic device through display actuation, in accordance with some implementations.

FIG. 10 illustrates technique of compensating for motion blur due to inter-frame movement of an electronic device through actuating a display presenting the content. In FIG. 10, an actuator coupled to the display imparts a motive force onto the display in response to a control signal generated by an actuator control unit of the electronic device. The motive force imparted in FIG. 10 is an oscillatory motive force 1010 that is imparted on the display along visual axis 510 while content 1020 is presented on the display. In FIG. 10, content 1020 includes three frames: frame 1021 defined by frame portions 1021A and 1021B; frame 1023; and frame 1025.

Similar to the space-time diagrams discussed above with reference to FIGS. 5-7, inter-frame movement of an electronic device caused by the user occurs in a leftward direction with respect to visual axis 510 along the x-axis (labeled "space") towards the y-axis (labeled "time"). That inter-frame movement causes motion blur in a rightward direction with respect to visual axis 510 along the x-axis away from the y-axis. Moreover, as in FIG. 6, a duty cycle of the display has been modified such that activated pixels remain illuminated for a portion of a frame duration in FIG. 10. For example, the duty cycle of the display was modified such that activated pixels only remain illuminated during frame portion 1021A. During frame portion 1021B, those pixels are not illuminated or deactivated.

FIG. 10 illustrates that by imparting oscillatory motive force 1010 on the display along visual axis 510 a resulting movement of the display opposes the inter-frame movement of the electronic device. In one implementation, oscillatory motive force 1010 has an amplitude element corresponding to a velocity associated with the movement of the electronic device. In an embodiment, oscillatory motive force 1010 has an orientation element that relates to a direction associated with the movement of the electronic device.

As discussed above with respect to FIG. 6, no optical energy is emitted by deactivated pixels, and consequently no optical energy is moving across a user's retina during frame portion 1021B to be perceived as blurred or smeared. Consequently, only image data corresponding a frame portion in which pixels are activated (e.g., frame portion 1021A) could be perceived as blurry due to motion blur. In one implementation, the duty cycle of the display is synchronized with the movement of the display (e.g., oscillatory movement 1010) to increase a likelihood that the display emits light when the display is linearly accelerating.

As seen in FIG. 10, movement of the display resulting from oscillatory motive force 1010 during frame portion 1021A (represented by designator 1011) opposes the inter-frame movement of the electronic device during frame portion 1021A. Consequently, those opposing movements would negate or substantially reduce any net movement of the display with respect to visual axis 510. Therefore, movement of the optical energy emitted by activated pixels during frame portion 1021A with respect to a user's retina centered about visual axis 510 would likewise be negated or substantially reduced. Instead, a perceived path of activated pixels during frame portion 1021A (represented by designator 1031) would substantially align with visual axis 510. That negation or reduction of that movement of the optical energy would reduce the effects of motion blur.

FIG. 11 is a block diagram of an example electronic device 120 that is suitable for implementing aspects of the present invention. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations electronic device 120 includes one or more processors 1102 (e.g., microprocessors, ASICs, FPGAs, GPUs, CPUs, processing cores, or the like), one or more I/O devices 1104, one or more interior or exterior facing image sensor systems 1106, one or more displays 1108, one or more communication interfaces 1110 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 1112, a memory 1120, and one or more communication buses 1150 for interconnecting these and various other components. In brief, a GPU can include a specialized electronic circuit designed to rapidly manipulate and alter memory to accelerate the creation of images in a frame buffer. A GPU can be present on a video card, or it can be embedded on a motherboard or—in certain CPUs—on the CPU die.

The one or more I/O devices 1104 are configured to provide a human to machine interface exchanging commands, requests, information, data, and the like, between electronic device 120 and a user. The one or more I/O devices 1104 can include, but are not limited to, a keyboard, a pointing device, a microphone, a joystick, and the like. In some implementations, the one or more I/O devices include at least one of an inertial measurement unit ("IMU"), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

The one or more image sensor systems 1106 comprise an image sensor (e.g., image sensor 122) that is configured to obtain content depicting a physical environment in which electronic device 120 is located ("physical content"). In one implementation, the one or more image sensor systems 1106 include an array of image sensors configured to capture light field images corresponding to a physical environment in which electronic device 120 is located. In one implementation, image sensor 122 is disposed on an exterior, outward facing surface of electronic device 120. Examples of suitable image sensors for effectuating image sensors of the one or more image sensor systems 1106 may include one or more RGB camera (e.g., with a complimentary metal-oxide-semiconductor ("CMOS") image sensor or a charge-coupled device ("CCD") image sensor), monochrome camera, IR camera, event-based camera, or the like.

In some implementations, the one or more image sensor systems 1106 are configured to obtain image data that corresponds to at least a portion of the face of the user that includes the eyes of the user. In various implementations, the one or more image sensor systems 1106 further include illumination sources that emit light upon the portion of the face of the user, such as a flash or a glint source.

In some implementations, the one or more displays 1108 are configured to present content, as described below in greater detail, to the user. In some implementations, the one or more displays 1108 correspond to holographic, digital light processing ("DLP"), liquid-crystal display ("LCD"), liquid-crystal on silicon ("LCoS"), organic light-emitting field-effect transitory ("OLET"), organic light-emitting diode ("OLED"), surface-conduction electron-emitter display ("SED"), field-emission display ("FED"), quantum-dot light-emitting diode ("QD-LED"), micro-electro-mechanical system ("MEMS"), or the like display types. In some implementations, the one or more 1108 correspond to diffractive, reflective, polarized, holographic, etc. waveguide displays. In some implementations, the one or more displays 1108 are capable of presenting any combination of physical content and virtual content.

In one implementation, the one or more displays 1108 includes a display device comprising a plurality of pixels and is configured to present content comprising image data obtained using image sensor 122. Each pixel among the plurality of pixels may be implemented using light-emitting diodes (LEDs), organic light-emitting diodes (OLEDs), plasma cells, liquid crystal display (LCD) components, and the like. In one implementation, the one or more displays 1108 are disposed on an inward facing surface of electronic device 120. In one implementation, the one or more displays 1108 are a see-through display through which a portion of the physical environment is visible.

In one implementation, the one or more displays 1108 include a stereoscopic image display for presenting left-eye and right-eye view points. In one implementation, the stereoscopic image display presents a stereoscopic subset of a 3D representation of a scene corresponding to a physical environment (e.g., scene 105 of FIG. 1) in which electronic device 120 is located. In one implementation, the 3D representation of the scene is reconstructed using light field images captured by an array of image sensors included in image sensor system 1106. In one implementation, electronic device 120 includes an actuator device comprising a first actuator and a second actuator that independently move each display of the stereoscopic image display.

The one or more communication interfaces 1110 can include any device or group of devices suitable for establishing a wired or wireless data or telephone connection to one or more networks. Non-limiting examples of a network interface device include an Ethernet network adapter, a modem, or the like. A device can transmit messages as electronic or optical signals.

The one or more programming (e.g., I/O) interfaces 1112 are configured to communicatively couple the one or more I/O devices with other components of electronic device 120. As such, the one or more programming interfaces 1112 are capable of accepting commands or input from a user via the one or more I/O devices 1104 and transmitting the entered input to the one or more processors 1102.

The memory 1120 can include any suitable computer-readable medium. A computer readable storage medium should not be construed as transitory signals per se (e.g., radio waves or other propagating electromagnetic waves, electromagnetic waves propagating through a transmission media such as a waveguide, or electrical signals transmitted through a wire). For example the memory 1120 may include high-speed random-access memory, such as DRAM, SRAM, DDR RAM, or other random-access solid-state memory devices. In some implementations, the memory 1120 includes non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 comprises a non-transitory computer readable storage medium. Instructions stored in the memory 1120 may be executed by the one or more processors 1102 to perform a variety of methods and operations, including the techniques of compensating for motion blur while presenting content on a display of an electronic device through display actuation that are described in greater detail above.

In some implementations, the memory 1120 or the non-transitory computer readable storage medium of the memory 1120 stores the following programs, modules and data structures, or a subset thereof including an optional operating system 1130 and a blur compensation module 1140. The operating system 1130 includes procedures for handling various basic system services and for performing hardware dependent tasks. In some implementations, the blur compensation module 1140 is configured to compensate for motion blur while presenting content on the one or more displays 1108 through display actuation. To that end, in various implementations, the blur compensation module 1140 includes inter-frame tracking unit 1142, actuator control unit 1144, eye tracking unit 1146, and data exchange unit 1148.

In some implementations, the inter-frame tracking unit 1142 is configured to determine an inter-frame movement of electronic device 120 based on a detected movement of electronic device 120 while content is presented on the one or more displays 1108. In one implementation, the inter-frame tracking unit 1142 is configured to determine the inter-frame movement of electronic device using inertial data associated with the movement that is obtained using the one or more I/O devices 1104. In one implementation, the inter-frame tracking unit 1142 is configured to determine the inter-frame movement of electronic device using image data depicting a proximate environment of electronic device 120 that is obtained using an image sensor of the one or more image sensor systems 1106 that is disposed on an outward facing surface of electronic device 120. In one implementation, the inter-frame tracking unit 1142 is configured to determine the inter-frame movement of electronic device using image data depicting a user of electronic device 120 that is obtained using an image sensor of the one or more image sensor systems 1106 that is disposed on an inward facing surface of electronic device 120. To that end, in various implementations, the inter-frame tracking unit 1142 includes instructions or logic therefor, and heuristics and metadata therefor.

In some implementations, the actuator control unit 1144 is configured to generate control signals that cause at least one actuator coupled with the one or more displays 1408 to impart a motive force on the one or more displays 1408. To that end, in various implementations, the actuator control unit 1144 includes instructions or logic therefor, and heuristics and metadata therefor.

In some implementations, the eye tracking unit 1146 is configured to determine an eye tracking characteristic of a user based on image data received from an image sensor of image sensor system 1106. To that end, in various implementations, the eye tracking unit 1146 includes instructions or logic therefor, and heuristics and metadata therefor.

In some implementations, the data exchanging unit 1148 is configured to obtain data (e.g., presentation data, interaction data, sensor data, location data, etc.) from one or more computing devices external to electronic device 120. In some implementations, the data exchanging unit 1148 is configured to transmit data (e.g., presentation data, location data, etc.) to one or more computing devices external to electronic device 120. To those ends, in various implementations, the data transmitting unit 1148 includes instructions or logic therefor, and heuristics and metadata therefor.

Although the inter-frame tracking unit 1142, the actuator control unit 1144, the eye tracking unit 1146, and the data exchange unit 1148 are shown as residing on a single device (e.g., electronic device 120), it should be understood that in other implementations, any combination of the inter-frame tracking unit 1142, the actuator control unit 1144, the eye tracking unit 1146, and the data exchange unit 1148 may be located in separate computing devices.

FIG. 11 is intended more as functional description of the various features which are present in a particular implementation as opposed to a structural schematic of the implementations described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at an electronic device with a display, a sensor, and an actuator coupled to the display:
detecting movement of the electronic device using the sensor while presenting content on the display;
determining an inter-frame movement of the electronic device based on the movement of the electronic device; and
moving the display using the actuator in synchrony with a duty cycle of the display such that the display is moved:
in a first direction such that movement of the display opposes the inter-frame movement of the electronic device while activated pixels of the display are illuminated; and
in a second direction, opposite the first direction, while the activated pixels are not illuminated.

2. The method of claim 1, wherein determining the inter-frame movement comprises determining a translation vector defining the inter-frame movement.

3. The method of claim 2, wherein moving the display is based on the translation vector.

4. The method of claim 1, wherein the actuator produces an oscillatory motive force along a single axis.

5. The method of claim 4, wherein the oscillatory force moves the display in the first direction along the single axis while the display is emitting light and the second, opposite direction along the single axis while the display is not emitting light.

6. The method of claim 4, wherein the oscillatory motive force has an amplitude element corresponding to a velocity associated with the movement of the electronic device and an orientation element that relates to a direction associated with the movement of the electronic device.

7. The method of claim 1, wherein the actuator is a first actuator, and wherein moving the display comprises:
imparting a first motive force along a first axis with the first actuator; and
imparting a second motive force along a second axis that is orthogonal to the first axis with a second actuator.

8. The method of claim 1, wherein the actuator produces a linear motive force along a single axis.

9. The method of claim 1, further comprising:
synchronizing the duty cycle of the display with the movement of the display to increase a likelihood that the display emits light when the display is linearly accelerating.

10. The method of claim 1, wherein the sensor is an inertial measurement unit configured to provide inertial data associated with the movement of the electronic device.

11. The method of claim 1, wherein the sensor is:
an image sensor disposed on an outward facing surface of the electronic device that is configured to generate image data depicting a proximate environment of the electronic device; or
an image sensor disposed on an inward facing surface of the electronic device that is configured to generate image data depicting a user of the electronic device.

12. An electronic device comprising:
a display;
a processor configured to determine a translation vector using data corresponding to movement of the electronic device, the translation vector defining inter-frame movement of a pixel of the display; and an actuator device that is coupled to the display and configured to move the display in synchrony with a duty cycle of the display and based on the translation vector such that the display is moved:
  in a first direction such that movement of the display opposes the movement of the electronic device while activated pixels of the display are illuminated; and
  in a second direction, opposite the first direction, while the activated pixels are not illuminated.

13. The electronic device of claim 12, wherein the display is coupled to a housing of the electronic device via a damped surface.

14. The electronic device of claim 12, wherein the display is a stereoscopic image display comprising a left display for presenting a left-eye viewpoint and a right display for presenting a right-eye viewpoint, and wherein the actuator device comprises a first actuator and a second actuator that independently move the left display and the right display, respectively, based on the translation vector.

15. The electronic device of claim 12, wherein the processor is further configured to synchronize the duty cycle of the display with the movement of the display to increase a likelihood that the display emits light when the display is linearly accelerating.

16. The electronic device of claim 13, wherein the electronic device is a head mounted device.

17. An electronic device comprising:
a sensor configured to detect movement of the electronic device;
a processor configured to determine a translation vector based on the movement of the electronic device, the translation vector defining a displacement of the electronic device in a ground reference frame between a first time and a second time subsequent to the first time; and
an actuator device that is coupled to the display and configured to move the display in synchrony with a duty cycle of the display and based on the translation vector such that the display is moved:
  in a first direction such that movement of the display opposes the movement of the electronic device while activated pixels of the display are illuminated; and
  in a second direction, opposite the first direction, while the activated pixels are not illuminated.

18. The electronic device of claim 17, wherein a time period defined by the first time and the second time corresponds to a frame rate of content for presentation on the display.

19. The electronic device of claim 17, wherein the actuator is a linear actuator configured to impart a unidirectional motive force along one axis, wherein the motive force is an oscillatory motive force having an amplitude element corresponding to a velocity associated with the movement of the electronic device and an orientation element that relates to a direction associated with the movement of the electronic device.

20. The electronic device of claim 17, wherein the actuator is a two-dimensional stage actuator configured to impart a bidirectional motive force along two orthogonal axes, wherein the motive force is an oscillatory motive force having an amplitude element corresponding to a velocity associated with the movement of the electronic device and an orientation element that relates to a direction associated with the movement of the electronic device.

* * * * *